United States Patent [19]

Braceras et al.

[11] Patent Number: 5,781,922
[45] Date of Patent: Jul. 14, 1998

[54] PAGE BOUNDARY CACHES

[75] Inventors: George M. Braceras, Colchester; Kenneth J. Goodnow, Essex Junction; Sebastian T. Ventrone, South Burlington, all of Vt.

[73] Assignee: International Business Machines Corporation, Armonk, N.Y.

[21] Appl. No.: 751,465

[22] Filed: Nov. 19, 1996

[51] Int. Cl.$^6$ .............................. G06F 12/06; G06F 12/10
[52] U.S. Cl. ..................... 711/118; 711/154; 711/206
[58] Field of Search ............................ 711/118, 203, 711/206, 207, 154, 171

[56] References Cited

U.S. PATENT DOCUMENTS

| | | | |
|---|---|---|---|
| 4,445,174 | 4/1984 | Fletcher | 711/121 |
| 4,860,192 | 8/1989 | Sachs | 711/3 |
| 5,077,826 | 12/1991 | Grohoski et al. | 711/207 |
| 5,091,846 | 2/1992 | Sachs et al. | 711/130 |
| 5,278,964 | 1/1994 | Mathews et al. | 711/3 |
| 5,293,609 | 3/1994 | Shih et al. | 711/137 |
| 5,325,499 | 6/1994 | Kummer et al. | 711/143 |
| 5,335,333 | 8/1994 | Hinton et al. | 711/207 |
| 5,394,533 | 2/1995 | Doi et al. | 711/3 |
| 5,412,787 | 5/1995 | Forsyth | 711/207 |
| 5,450,561 | 9/1995 | Ryan | 711/3 |
| 5,465,337 | 11/1995 | Kong | 711/207 |
| 5,526,504 | 6/1996 | Hsu | 711/207 |
| 5,606,683 | 2/1997 | Riordan | 711/207 |
| 5,715,420 | 2/1998 | Kahle | 711/206 |

Primary Examiner—Tod R. Swann
Assistant Examiner—Christopher S. Chow
Attorney, Agent, or Firm—Whitham, Curtis, & Whitham; Eugene Schkurko, Esq.

[57] ABSTRACT

A first level (L1) memory cache is structured on page boundaries, allowing for dynamic allocation of N byte pages based upon program needs. The contents of the cache are accessed by first determining the page location by cache address translation and then indexing directly into the cache. A starting page address tag exists for each page in the cache. If the page address is contained in the current page lookup, the in-line data is directly fetched. Direct fetching without address lookup speeds up the cache access cycle. If the address is not a current page, then the page address lookup occurs to obtain the correct page address block index into the page data macro. If a miss occurs, a page reload follows.

6 Claims, 4 Drawing Sheets

PAGE BOUNDARY CACHES

BACKGROUND OF THE INVENTION

1. Field of the Invention

The present invention generally relates to first level (L1) memory caches for microprocessors and, more particularly, to a cache structure which better reflects program flow of a microprocessor and improves the reload time of the cache.

2. Background Description

Today's microprocessor architecture is based upon a word line structure within the memory cache. Each word line represents a direct mapping of the lower address bits, with the upper address bits being stored in the tag portion of the cache. For smaller programs, this structure worked well, but as programs get larger, more contention can occur for each particular word line. Each time a line is stored in the cache, discarded, and then has to be reloaded, valuable time is wasted.

Another problem of maximizing performance involves the bus bandwidth for processors. As the processor core speed increases, this bus speed has a larger impact on system performance. Since the bus speed is normally some fraction of the internal core speed, any decrease in performance on the system bus is magnified by the multiplying factor of the core clock. The frequency in which word lines must be reloaded has direct impact on overall system performance.

To maximize performance, one approach would be to try to limit the amount of word line reloads that occur while processing a particular task. To accomplish this, a cache structure that would better represent actual program structure is needed.

SUMMARY OF THE INVENTION

It is therefore an object of the present invention to provide a cache structure that better reflects program flow of a microprocessor.

It is another object of the invention to provide a cache structure which improves the reload time of level one (L1) caches.

According to the invention, memory caches are structured on page boundaries, allowing for dynamic allocation of N byte pages based upon program needs. The contents of the cache are accessed by first determining the page location by cache address translation and then indexing directly into the cache. A starting page address tag exists for each page in the cache. If the page address is contained in the current page lookup, the in-line data is directly fetched. Direct fetching without address lookup speeds up the cache access cycle. If the address is not a current page, then the page address lookup occurs to obtain the correct page address block index into the page data macro. If a miss occurs, a page reload follows.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The key component of this invention is to structure the memory caches on a page boundary structure, allowing for dynamic allocation of N byte pages based upon program needs. This is a major departure from current cache architectures.

As the silicon density of today's technology increases, the ability to have large amounts of memory on the silicon exists. These larger memory caches allow the onboard cache to mirror the system memory more accurately than in the past. The structure of the cache can be changed to represent a more accurate memory model of the system memory.

The cache structure according to the invention is divided up into page segments. Each page segment is N bytes of data that is in linear order from the starting address. For each page contained in the cache, a starting page address Tag exists. The contents of the cache are accessed by first determining the page location by cache address translation, and then indexing directly into the cache.

Figure 1:
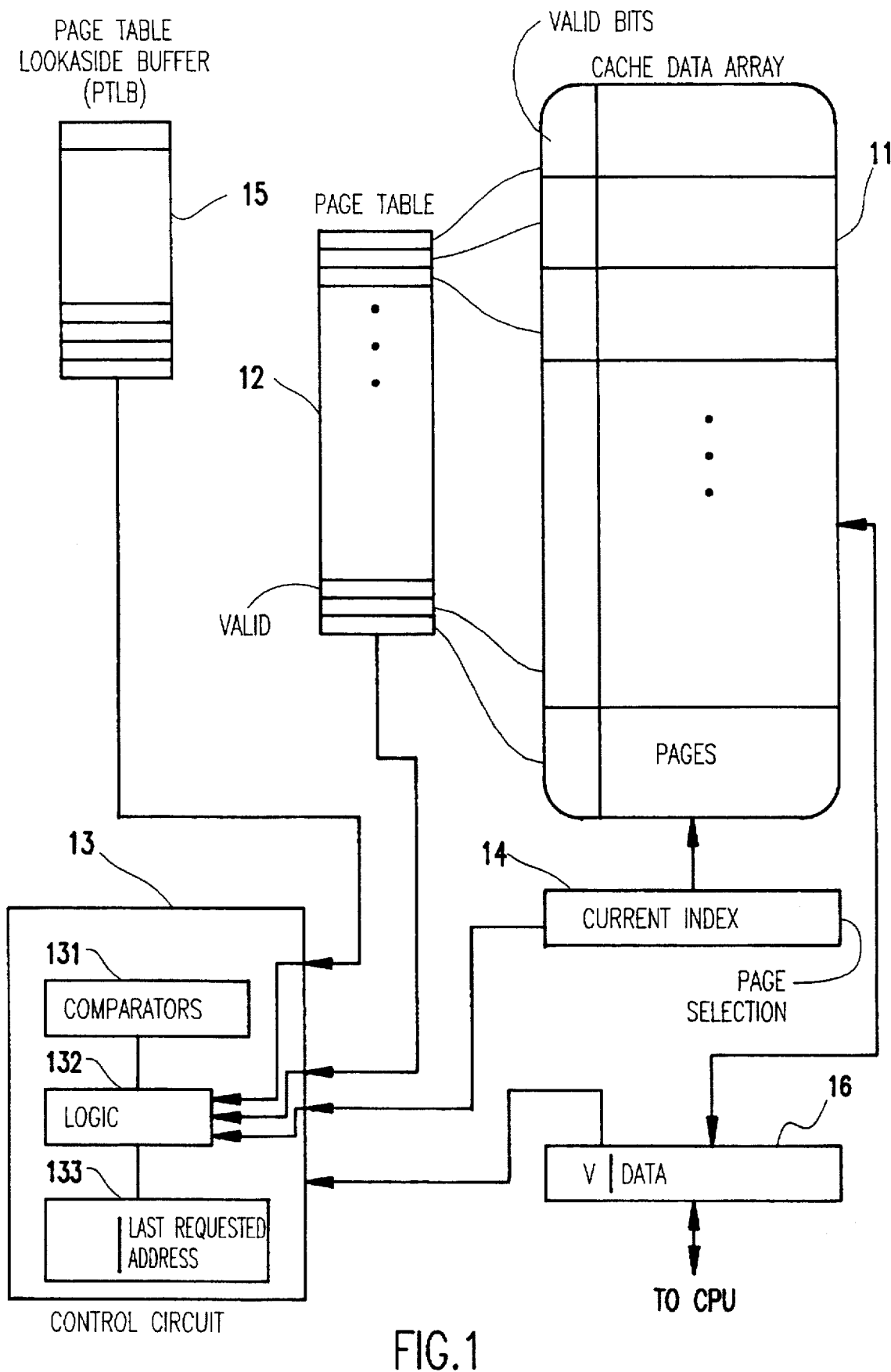
FIG. 1 is a block diagram showing a cache structure of the page cache unit according to the invention.

Referring now to the drawings, and more particularly to FIG. 1, there is shown a page boundary cache structure according to the invention. The cache structure includes a cache data array 11 which holds a plurality of memory pages. Each line of each page in the cache data array 11 has an associated valid bit. A page tag table 12 contains entries holding a tag field containing required address bits and the location in the cache data array of the assigned page location. Each entry of the page tag table 12 has an associated valid bit. A control circuit 13 allocates data entries on a cache miss, finds the page in the data cache 11 and loads a current index circuit 14. The current index circuit 14 holds one or more recently used page tag entries such that the cache data array 11 can be directly accessed for these addresses without incurring the delay associated with the delay of the control circuit.

The control circuit 13 finds the page in the data cache array 11 by accessing the page tag table 12 and a page table lookaside buffer (PTLB) 15. If the address for the data requested is not in the current index circuit 14, the control circuit checks the PTLB 15 to determine if the address is in that buffer. If it is, it is loaded into the current index circuit 14, and the data is then accessed from the cache data array 11. If not in the PTLB 15, the control circuit 13 then checks the page tag table 12 for a valid match. If a valid match is found, the control circuit 13 updates the PTLB 15 and loads the address in the current index circuit 14. If no valid match is found, then a the control circuit 13 enters a process for replacing the tag with the requested tag, as will be described in more detail with reference to FIGS. 3A and 3B.

The control circuit 13 is itself composed of comparators 131, logic 132 and a register 133 containing the last requested address. Data read from the cache data array 11 is supplied to the microprocessor via output register 16. This data is marked as valid or invalid by setting the V bit in the output register 16 by the control circuit 13.

The invention is implemented using a set mapping of page address into the cache. External to the cache data array 11 is a page table lookaside buffer 15 of the most recently used (MRU) page entries. The microprocessor issues a request address command to the control circuit 13. If the address is contained in the current index circuit 14, then the in-line data is directly fetched. This direct fetching of the data with no address lookup significantly speeds up the cache access cycle. This speed up of the data access is one of the benefits of the invention.

Figure 2:
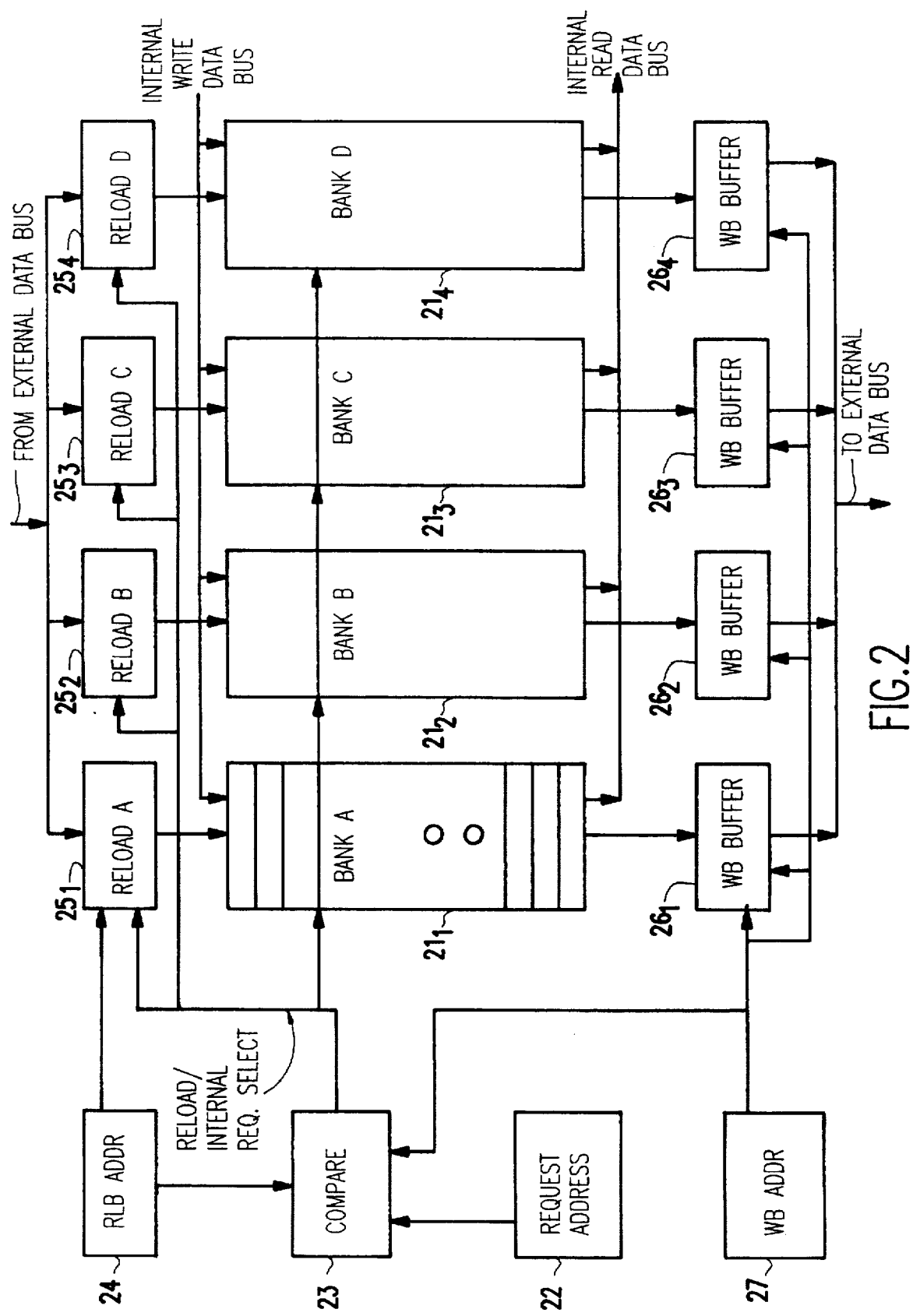
FIG. 2 is a block diagram showing an example of a page boundary cache macro according to a specific implementation of the invention.

FIG. 2 illustrates one possible implementation of the actual page boundary cache macro. Each page is broken into N banks (four shown in FIG. 2) $21_1$, $21_2$, $21_3$, and $21_4$. The request address input at register 22 is spread sequentially across the N banks before returning to the starting bank. These banks increase the potential bandwidth of a processor request and an ongoing page reload. As a top priority, whenever a request address from the processor is active, the reload logic that the requesting address hits will always respond by accessing the proper page within a bank to service the request. This prioritization is taken care in the comparator 23 by looking at the current page reload address in register 24 along with the requesting address in register 22. If there is a match, then the page reload address will wait until the next free cycle for that bank. Reload buffers $25_1$, $25_2$, $25_3$, and $25_4$ (one for each of the N banks) accept data from an external data bus and are provided so that during a page reload, if a bank is busy with an internal request, the corresponding reload buffer can accept data and wait for the next available time slot to load the data into the page of that bank. Write back buffers $26_1$, $26_2$, $26_3$, and $26_4$ (one for each of the N banks), responsive to write back address register 27, are connected to an external data bus and are provided for when dirty lines need to be written out to external memory. If the external data bus cannot take the request, then the data can be held in write back buffers until the next available external bus cycle.

Figure 3A:
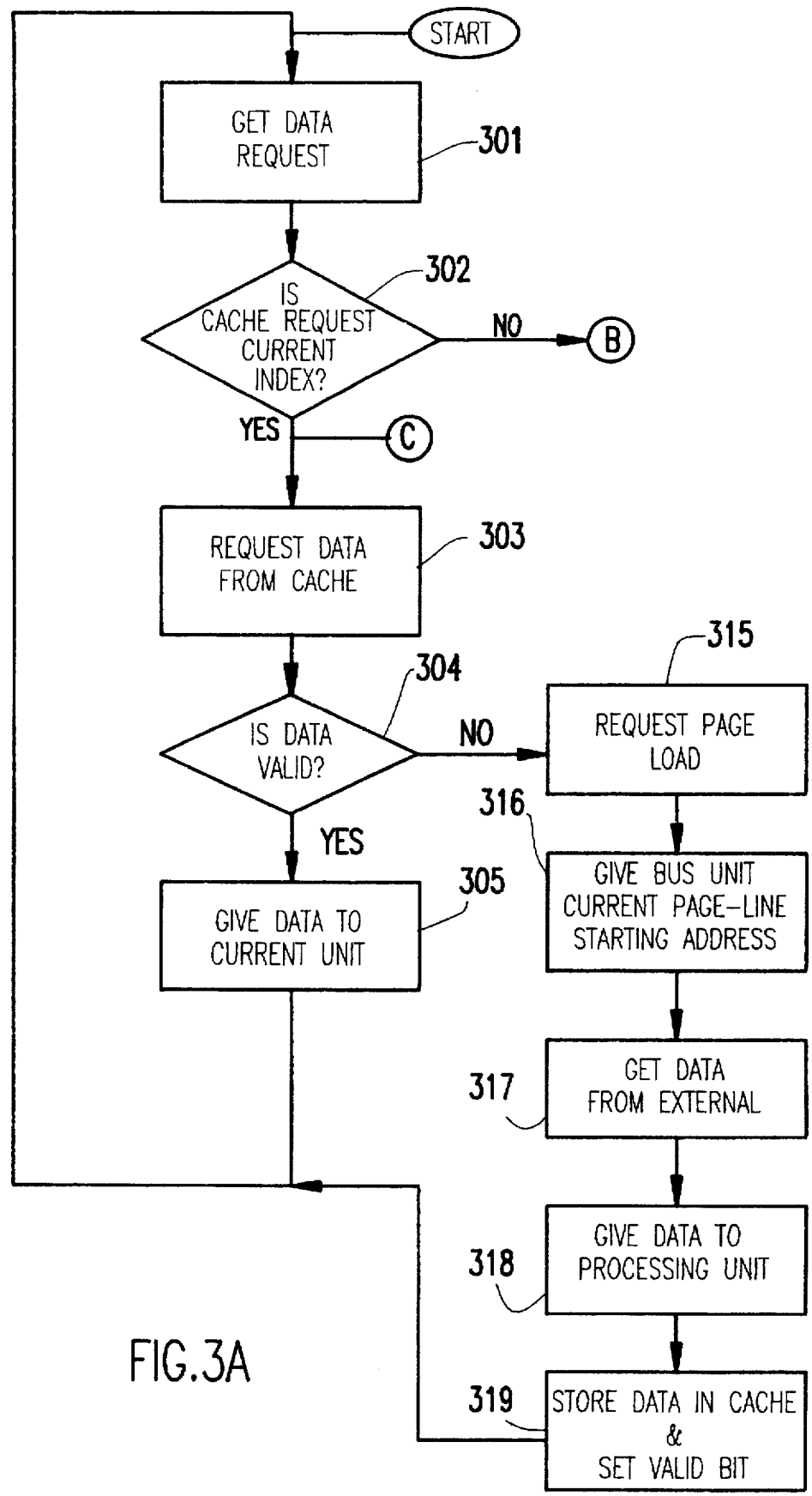
FIGS. 3A and 3B, taken together, are a flow diagram showing the logic of the operation of the cache structure according to the invention.
Figure 3B:
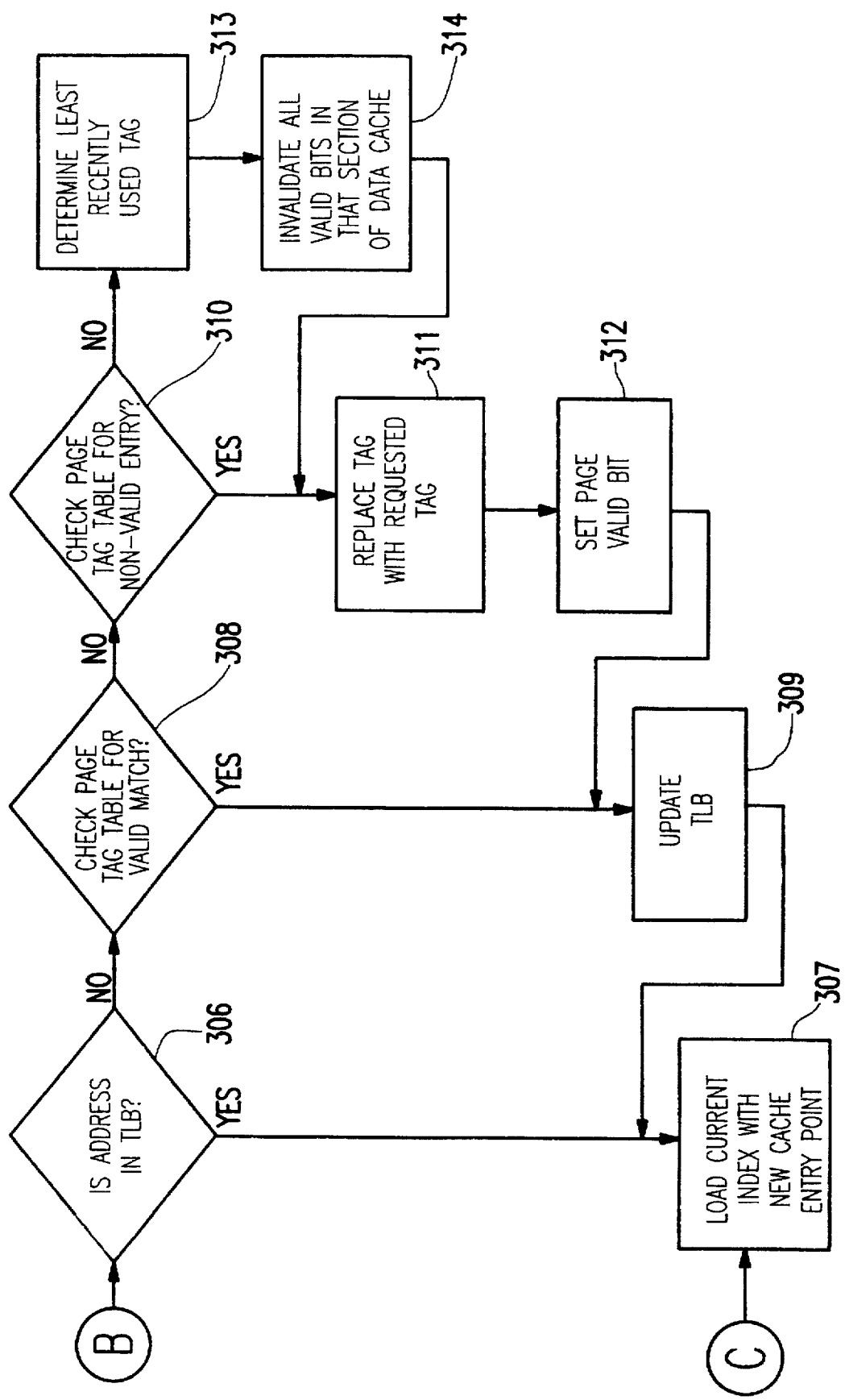

Referring to FIGS. 3A and 3B, the process is illustrated by way of a flow diagram. Referring first to FIG. 3A, the process starts with a data request from the microprocessor in function block 301. A test is made in decision block 302 to determine if the data requested is in the current indexes 14. If so, the data is requested directly from the cache 11 and output to register 16 in function block 303. A test is made in decision block 304 to determine if the data in register 16 is valid data. This is done by testing the V bit in the register. If valid data, the data in register 16 is output to the microprocessor in function block 305, and the process loops back to await the next data request from the microprocessor.

Should the data request in be in the current index 14, as determined in decision block 302, then the process branches to FIG. 3B, as indicated by the B connectors. A test is made in decision block 306 to determine if the address for the requested data is in the PTLB 15. If so, the current index 14 is loaded with the new cache entry point in function block 307, and the process returns to function block 303 in FIG. 3A, as indicated by the C connectors.

If the address is not in the PTLB 15, as determined by decision block 306, the page tag table 12 is checked for a valid match in decision block 308. If a valid match is found, then the PTLB 15 is updated in function block 309 before the process goes to function block 307. On the other hand, if a valid match is not found, then the page tag table 12 is checked for a non-valid entry in decision block 310. If a non-valid entry is found, that tag is replaced with the requested tag in function block 311 and the page valid bit is set in function block 312 before the process goes to function block 309. If no non-valid entries are found in the page tag table 12, the least recently used (LRU) tag is determined in function block 313. Then, in function block 314, all valid bits in that section of the data cache are invalidated, before the process goes to function block 311.

Returning again to FIG. 3A, if the data is not valid, as determined in decision block 304, then a page load request is made in function block 315. The bus unit is given current page/line starting address in function block 316, and the data is retrieved from an external memory in function block 317.

The retrieved data is given to the microprocessor in function block 318, and the data is also stored in the cache data array 11 and the valid bit set in function block 318.

To summarize, if the address is not a current page, then a page address lookup occurs to obtain the correct page address block index into the page data macro. If the page is most recently used, then a page address lookup occurs to see if the page is a current page. If the page is a current page, then the index into the page macro is generated, and the page address table is updated. In addition, the current index address(es) are updated to reflect the new address.

The page macro has two levels of indexing. The first level is an indexing that defines the granularity of the pages. The second level of indexing is a direct mapping of the address bits to a location within the page macro itself. The data can then be returned to the requester. If a miss occurs completely, then the program would have requested a page not loaded into the cache, or one that had not been used recently.

A page reload follows a special protocol. The microprocessor will broadcast to the memory controller that a page miss has occurred with the starting address. This starting address can be anywhere within the page macro. The memory control loads a page address boundary register, marking the current page reload, along with the current index into the page reload. The loading starts at the index address, and continues upward. The microprocessor forwards the return data to both the requester, and to the page macro internal. The page macro loads the current data into the page cache and marks the current entry as valid. The valid bit indicates which entries in the page are valid, since a portion of the page will be not valid until completely loaded from the external world. Once the first reload has occurred, the memory controller and the processor continue to reload the page on an automatic mode. Up to N pages can be loaded from the memory controller at a time. The memory controller broadcasts on the bus the identification (ID), along with the index into the page as the data is being transferred. If the index does not match the processor current loading index, then a error will occur.

When the return data reload requests is equal to index minus one, then the page reload control will signal an end to the reloading of the current page. Due to the nature of the data transfer being of a large length, and a known order, the memory macros can be interleaved and banked for optimum reload speed. Also, the bus can be tailored for high speed reloading to minimize reload time.

Data coherency of a page boundary cache needs to be handled differently than current cache structures. When another bus master requests a data entry that is resident within the page macro and is dirty, the processor will respond with a back off signal, and provide the data to the requesting bus master.

If a page miss has occurred, and a new page table is loaded, the processor will discard the least recently used (LRU) page. If the page has not been written, then the processor will reload over the existing page. If a page is dirty, the dirty bits will be written to a temporary holding page for only the words that are dirty, then the dirty lines will be written to the external world.

By structuring the cache in this manner, the microprocessor can decrease the bus request cycles resulting in increased system performance. Thus, while the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A cache structure for holding memory data on a page basis comprising:

a cache data array holding a plurality of memory pages, each page including one or more valid bits to indicate that data associated with the page is resident in the cache;

a page tag table having a plurality of entries, each entry holding a tag field containing required address bits and a location in the cache data array of an assigned page location;

a control circuit connected to access the page tag table to allocate data array entries on a cache miss and to find a page in the cache data array; and a current index circuit holding one or more recently used page tag entries such that the cache data array can be directly accessed for these addresses without incurring a delay associated with a delay of the control circuit.

2. The cache structure recited in claim 1 further comprising a page table lookaside buffer storing most recently used page entries, and wherein the control circuit accesses the page table lookaside buffer to quickly find a cache page location of a page that is not in the current index circuit.

3. The cache structure recited in claim 2 wherein the cache data array comprises:

a plurality of banks for each page, an address being spread sequentially across the banks before returning to a starting bank;

a plurality of reload buffers, one for each bank, for accepting data from an external data bus, the reload buffers holding data until a next available time slot to load data into a bank if a corresponding bank is busy with an internal request; and a plurality of write back buffers, one for each bank, for receiving data from the plurality of banks and writing the data to an external bus, the write back buffers holding data until a next available external bus cycle if the external bus is busy.

4. A cache management method for a cache having a cache data array holding a plurality of memory pages and wherein data stored in the cache data array includes a valid field, a page tag table holding a plurality of entries with locations in the cache data array of an assigned page location, a page table lookaside buffer storing most recently used page entries, and a current index register holding one or more recently used page tag entries, the cache management method comprising the steps of:

receiving a data request;

determining if the data request is in the current index register and, if so, requesting the data from the cache data array;

but if the data request is not in the current index register, checking the page table lookaside buffer to determine if the address resident there and, if so, loading the current index register with a new cache entry point; and but if the data request is not in the page table lookaside buffer, checking the page tag table to determine a valid match and, if a valid match, then updating the page table lookaside buffer before loading the current index register with the new cache entry point and requesting data from the cache.

5. The method of cache management recited in claim 4 further comprising the steps of:

checking the valid field of data read out of the cache data table to determine if the data is valid and, if so, outputting the data;

but if the data is not valid, requesting a page load from an external memory; and storing data from the external memory in the cache data array and setting the valid field of the stored data to valid.

6. The cache management method recited in claim 5 wherein if, on checking the page tag table, there is no valid match, further comprising the steps of:

checking the page tag table for a non-valid entry and, if found, replacing the tag with a requested tag and setting the page valid field to valid before updating the page table lookaside buffer;

but if not found, determining a least recently used tag and invalidating all valid bits in a corresponding section of the cache data array before replacing the tag with a requested tag.

* * * * *

UNITED STATES PATENT AND TRADEMARK OFFICE
CERTIFICATE OF CORRECTION

PATENT NO. : 5,781,922
DATED : July 14, 1998
INVENTOR(S) : George M. Braceras et al.

It is certified that error appears in the above-identified patent and that said Letters Patent is hereby corrected as shown below:

On the title page, under item[56]:

Attorney, Agent, or Firm, please change "Schkurko" to --Shkurko--.

Signed and Sealed this

Twenty-ninth Day of June, 1999

Attest:

Q. TODD DICKINSON

*Attesting Officer*     *Acting Commissioner of Patents and Trademarks*